United States Patent [19]
Geiger

[11] Patent Number: 4,895,125
[45] Date of Patent: Jan. 23, 1990

[54] APPARATUS FOR THE FEEDBACK OF EXHAUST GASES IN AN INTERNAL COMBUSTION ENGINE

[75] Inventor: Istvan Geiger, Braunschweig, Fed. Rep. of Germany

[73] Assignee: Volkswagen Aktiengesellschaft, Wolfsburg, Fed. Rep. of Germany

[21] Appl. No.: 248,943

[22] Filed: Sep. 23, 1988

[30] Foreign Application Priority Data

Sep. 23, 1987 [DE] Fed. Rep. of Germany ....... 3731909

[51] Int. Cl.$^4$ ................... F02M 25/06; F02D 9/02
[52] U.S. Cl. ........................... 123/568; 123/587
[58] Field of Search ............... 123/339, 568, 569, 570, 123/571, 585, 587

[56] References Cited

U.S. PATENT DOCUMENTS

| | | | |
|---|---|---|---|
| 4,079,710 | 3/1978 | Moriya et al. | 123/568 |
| 4,223,650 | 9/1980 | Herbert | 123/568 |
| 4,231,337 | 11/1980 | Kuwahara et al. | 123/568 |
| 4,249,503 | 2/1981 | Noguchi et al. | 123/568 |
| 4,304,210 | 12/1981 | Hayakawa | 123/568 X |
| 4,430,982 | 2/1984 | Diaz | 123/568 |
| 4,546,751 | 10/1985 | Jarnuszkiewicz et al. | 123/568 |
| 4,546,752 | 10/1985 | Blaser et al. | 123/568 |
| 4,637,366 | 1/1987 | Cowles | 123/568 |

FOREIGN PATENT DOCUMENTS 0089492 2/1985 European Pat. Off. .
2655991 6/1978 Fed. Rep. of Germany .

*Primary Examiner*—Willis R. Wolfe
*Attorney, Agent, or Firm*—Spencer & Frank

[57] ABSTRACT

An internal combustion engine has an intake gas conduit; an output setting member disposed in the intake gas conduit and arranged for controlling therein the flow of intake gas; an exhaust gas conduit; a throttle member disposed in the intake gas conduit upstream of the output setting member; a bypass conduit having an inlet end coupled to the intake gas conduit upstream of the throttle member and an outlet end coupled to the intake gas conduit downstream of the throttle member; an exhaust gas feedback conduit having an inlet end coupled to the exhaust gas conduit and an outlet end coupled to the bypass conduit; and a control arrangement for setting positions of the throttle member as a function of an operational parameter of the internal combustion engine for directing a quantity of intake air into the bypass conduit as a function of the operational parameter.

8 Claims, 1 Drawing Sheet

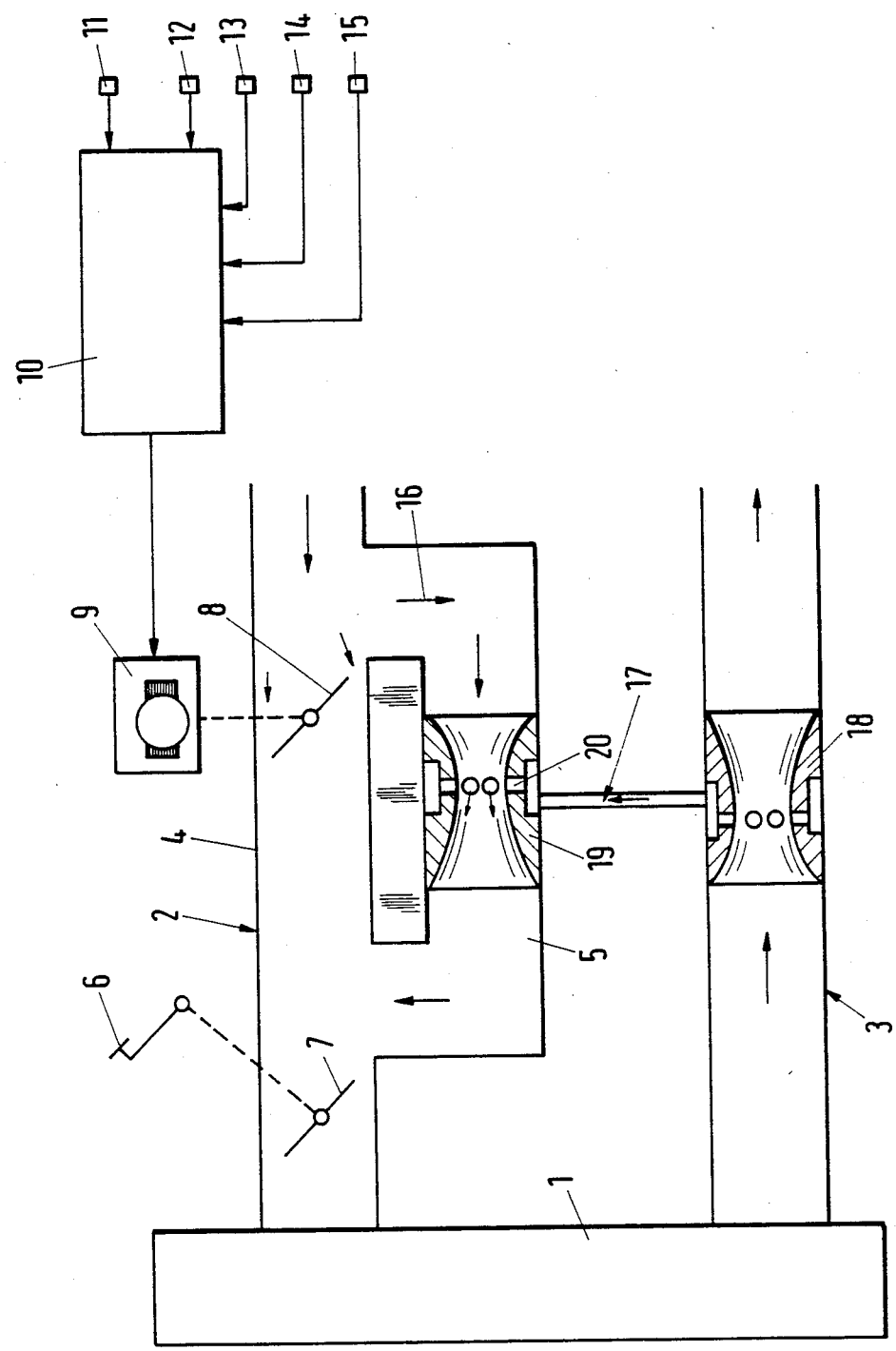

APPARATUS FOR THE FEEDBACK OF EXHAUST GASES IN AN INTERNAL COMBUSTION ENGINE

BACKGROUND OF THE INVENTION

This invention relates to an internal combustion engine having an exhaust gas feedback conduit which extends from the exhaust conduit and which opens into the gas intake conduit upstream of an output setting member, such as a butterfly throttle valve.

In order to reduce pollutants in exhaust gases of internal combustion engines, particularly those used as power plants for automotive vehicles and, at the same time, to effect an improved utilization of the fuel, it is known to reintroduce the exhaust gases into the combustion process, that is, into the combustion chambers of the internal combustion engine.

A particular problem involved in the feedback of exhaust gases concerns a proper metering of the returned exhaust gases since, understandably, a constant exhaust gas quantity cannot be fed back into the combustion process over the entire operational range of the engine, that is, from idling run to full load.

In some arrangements, as disclosed, for example, in U.S. Pat. No. 4,079,710, the exhaust gas feedback conduit merges into the suction pipe (fresh gas intake conduit) downstream of the throttle valve (butterfly valve) which is connected with the accelerator pedal and which constitutes output setting member. On the other hand, according to U.S. Pat. No. 4,223,650, the exhaust gas feedback conduit merges into the suction pipe upstream of the output setting member and has the advantage that additional valves in the exhaust gas feedback conduit may be dispensed with. Although, as taught in the last-named U.S. patent, by virtue of positioning the inlet of the exhaust gas feedback conduit in the narrowest cross-sectional area of a venturi arranged upstream of the air filter of the engine, a certain relationship between the returned exhaust gas quantity and the inflowing fresh gas may be achieved without the need of additional valves (which would be actuated, for example, by the pressure in the suction pipe), it has been found that this solution does not take into account the requirements of current internal combustion engines.

Therefore, as disclosed in German Offenlegungsschrift (non-examined published patent application) No. 2,655,991, in order to increase the fed back exhaust gas quantities, it has been attempted to increase the pressure ratios and pressure differences—which determine the returned exhaust gas quantities—by placing the outlet of the exhaust gas feedback conduit in the intake gas conduit between two butterfly valves which are synchronously operated by the accelerator pedal. This arrangement, however, also does not take into account to a satisfactory extent the conditions in the internal combustion engine for the different operational modes or states.

To round out the state of the prior art, reference is further made to European Patent No. 89,492 which describes an internal combustion engine having two output setting members arranged serially in the intake gas conduit. One of the setting members is conventionally coupled with the accelerator pedal, while the other setting member is moved by a setting motor which is controlled electronically as a function of several operational parameters of the internal combustion engine and the vehicle. Such an engine design having two output setting members, one operated by the driver of the vehicle and the other moved as a function of operational parameters is intended to reduce fuel consumption; an exhaust gas feedback is not intended.

SUMMARY OF THE INVENTION

It is an object of the invention to provide an improved apparatus for the feedback of exhaust gases in an internal combustion engine, particularly without using additional valves in the exhaust gas feedback conduit, and wherein an optimal relationship between the fed back exhaust gas and the supplied fresh intake gas is ensured in a simple manner even over long operational periods of the engine.

This object and others to become apparent as the specification progresses, are accomplished by the invention, according to which, briefly stated, the internal combustion engine has an intake gas conduit; an output setting member disposed in the intake gas conduit and arranged for controlling therein the flow of intake gas; an exhaust gas conduit; a throttle member disposed in the intake gas conduit upstream of the output setting member; a bypass conduit having an inlet end coupled to the intake gas conduit upstream of the throttle member and an outlet end coupled to the intake gas conduit downstream of the throttle member; an exhaust gas feedback conduit having an inlet end coupled to the exhaust gas conduit and an outlet end coupled to the bypass conduit; and a control arrangement for setting positions of the throttle member as a function of an operational parameter of the internal combustion engine for directing a quantity of intake air into the bypass conduit as a function of the operational parameter.

Thus, according to the invention and as a departure from the disclosure in European Patent 89,492, the intake gas quantity does not flow in its entirety through the serially arranged output setting member and throttle member (which conventionally may be butterfly valves, but also may be constituted by sliding valves), but one part of the intake gas flows through the bypass conduit which circumvents the throttle member and into which the exhaust gas feedback conduit merges. Thus, as a function of engine parameters (and also possibly vehicle parameters) the throttle member sets the bypass flow of the intake gas. The bypass flow generates the pressure conditions which, in turn, determine the returned exhaust gas quantities. The more the throttle member is moved towards its closed position, the greater the intake gas proportion in the bypass conduit, given a constant position of the output setting member connected with the accelerator pedal, and therefore the greater the exhaust gas quantity fed back into the combustion process.

The electronic control device associated with the throttle member may be connected with various sensors detecting diverse operational magnitudes of the internal combustion engine (such as rpm, load, temperature) and also detecting, if desired, parameters of the vehicle served by the engine (such as the wheel rpm). It has been found to be particularly expedient to utilize, as a general approximation, the degree of rough engine run as a control or regulating magnitude for determining the feedback quantities for the exhaust gas of the internal combustion engine. The rough engine run is traceable to the differences in the contribution of the combustion in the individual cylinders to the generated torque of the internal combustion engine. Such contributions may be detected, for example, by monitoring the accelerations in the individual combustion chambers.

BRIEF DESCRIPTION OF THE DRAWING

The sole FIGURE is a diagrammatic sectional view of a preferred embodiment of the invention.

DESCRIPTION OF THE PREFERRED EMBODIMENT

The internal combustion engine proper (engine block) is designated at 1. The intake gas conduit system to be described in more detail later is designated at 2 whereas the exhaust conduit of the engine is designated at 3.

Turning to the intake gas system 2, the latter comprises the intake gas conduit 4 proper as well as a bypass conduit 5. A butterfly valve (output setting member) 7 connected with accelerator pedal 6 is situated in the intake gas conduit 4, while the bypass conduit 5 circumvents a throttle member 8 also situated in the intake gas conduit 4, at a location upstream of the throttle 7. The throttle 8 whose position determines the intake gas flow rate through the bypass conduit 5, is moved by an electromotor 9 which, in turn, is actuated by an electronic control device 10 connected to a plurality of sensors 11–15. In the example described, the sensor 11 monitors the engine rpm, the sensor 12 the momentary load, the sensor 13 emits signals representing the extent of rough engine run, the sensor 14 monitors the engine temperature whereas the sensor 15 detects a parameter of the vehicle (such as the wheel rpm) served by the internal combustion engine 1.

From the sensed parameters the electronic control device 10 forms a control signal for the electromotor 9 which turns the throttle member 8 into a certain open position (or, in an extreme case, in a closed position) which, in a given position of the output setting member 7 establishes a determined intake gas bypass flow 16 which generates, in each instance, optimal pressure conditions for the returned exhaust gases.

For introducing the exhaust gases into the intake gas conduit there is provided an exhaust gas feedback conduit 17 which extends between the narrowest cross-sectional passage area of a venturi 18 provided in the exhaust gas conduit 3 and the narrowest cross-sectional passage area of a venturi 19 situated in the bypass conduit 5. The exhaust gas venturi 18 is designed such that in all positions of the throttle members 7 and 8, that is, for all intake gas flow rates which may occur in any operational condition of the engine, the exhaust gas pressure at the narrowest venturi cross section remains at least approximately constant. In contradistinction, the venturi 19 in the bypass conduit 5 is so designed that at the inlet 20 of the exhaust gas feedback conduit 17 a pressure is set which effects an at least approximately linear relationship between the returned exhaust gas quantities on the one hand and the intake gas flow rate on the other hand. It is to be understood that, if required, a nonlinear relationship may be set.

The cross-sectional passage area of the bypass conduit 5 related to that of the intake gas conduit 4 may be of such a small value that in case of a fully open throttle 8 the exhaust gas feedback is suppressed without needing an additional valve arrangement.

Thus, as it has been described, the invention, while avoiding additional valves with movable components, provides for the advantageous possibility of an exact determination of the returned exhaust gas quantities even over extended operational periods of the engine, particularly because the extent of rough engine run utilized for adjusting the throttle member 8 supplies a direct indication for setting the engine.

The present disclosure relates to subject matter contained in Federal Republic of Germany Patent Application No. P 37 31 909.4 (filed Sept.23rd, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an internal combustion engine having
   an intake gas conduit;
   an output setting member disposed in said intake gas conduit and arranged for controlling therein the flow of intake gas; and
   an exhaust gas conduit;
   the improvement comprising
   (a) a throttle member disposed in said intake gas conduit upstream of said output setting member as viewed in the direction of flow of the intake gas;
   (b) a bypass conduit having an inlet end coupled to said intake gas conduit upstream of said throttle member and an outlet end coupled to said intake gas conduit downstream of said throttle member;
   (c) an exhaust gas feedback conduit having an inlet end coupled to said exhaust gas conduit and an outlet end coupled to said bypass conduit; and
   (d) control means for setting positions of said throttle member as a function of an operational parameter of the internal combustion engine for directing a quantity of intake air into said bypass conduit as a function of the operational parameter.

2. An internal combustion engine as defined in claim 1, further comprising a venturi situated in said bypass conduit; said venturi having a location of minimum flow passage area; said outlet of said exhaust gas feedback conduit being coupled to said location; said venturi being configured such that an at least approximately linear relationship between the quantity of intake gas supplied to the internal combustion engine and the quantity of exhaust gases fed back into the intake gas conduit is established.

3. An internal combustion engine as defined in claim 1, wherein the intake gas conduit and the bypass conduit have respective cross-sectional flow passage areas dimensioned relative to one another such that in a fully open position of said throttle member no exhaust gas feedback occurs.

4. An internal combustion engine as defined in claim 1, further comprising a venturi situated in said exhaust gas conduit; said venturi having a location of minimum flow passage area; said inlet of said exhaust gas feedback conduit being coupled to said location; said venturi being configured such that the pressure of the exhaust gases prevailing at said location is at least approximately independent from the pressure of the intake gas supplied to the internal combustion engine.

5. An internal combustion engine as defined in claim 4, wherein said venturi is a first venturi and said location is a first location; further comprising a second venturi situated in said bypass conduit; said second venturi having a second location of minimum flow passage area; said outlet of said exhaust gas feedback conduit being coupled to said second location; said second venturi being configured such that an at least approximately linear relationship between the quantity of intake gas supplied to the internal combustion engine and the quantity of exhaust gases fed back into the intake gas conduit is established.

6. An internal combustion engine as defined in claim 1, wherein said control means comprises a control apparatus; a sensor connected to the control apparatus and arranged for monitoring the operational parameter and applying a sensor signal to the apparatus.

7. An internal combustion engine as defined in claim 6, wherein said sensor is arranged for monitoring a rough run of the internal combustion engine.

8. An internal combustion engine as defined in claim 6, wherein said control means further comprises a setting motor connected to said apparatus for receiving therefrom a setting signal representing the magnitude of the parameter; said setting motor being connected to said throttle member for moving said throttle member in response to the setting signal.

* * * * *